US010022934B2

(12) United States Patent
Toy et al.

(10) Patent No.: US 10,022,934 B2
(45) Date of Patent: Jul. 17, 2018

(54) HEAT RECOVERABLE TUBE ASSEMBLY AND ADHESIVE COMPOSITION FOR HEAT RECOVERABLE TUBE ASSEMBLY

(71) Applicant: TYCO ELECTRONICS CORPORATION, Berwyn, PA (US)

(72) Inventors: Lester T. Toy, Fremont, CA (US); Danny Verheyden, Gelrode (BE); Vijay Daga, Sunnyvale, CA (US)

(73) Assignees: TE CONNECTIVITY CORPORATION, Berwyn, PA (US); TYCO ELECTRONICS BELGIUM EC BVBA, Oostkamp (BE)

( * ) Notice: Subject to any disclaimer, the term of this patent is extended or adjusted under 35 U.S.C. 154(b) by 527 days.

(21) Appl. No.: 14/340,704

(22) Filed: Jul. 25, 2014

(65) Prior Publication Data
US 2016/0023422 A1    Jan. 28, 2016

(51) Int. Cl.
B32B 1/08    (2006.01)
B32B 7/12    (2006.01)
(Continued)

(52) U.S. Cl.
CPC ............... B32B 1/08 (2013.01); B32B 7/12 (2013.01); B32B 17/064 (2013.01); B32B 27/08 (2013.01); B32B 27/12 (2013.01); C09J 123/06 (2013.01); C09J 123/12 (2013.01); C09J 151/06 (2013.01); G02B 6/3809 (2013.01); B32B 2250/03 (2013.01); B32B 2262/101 (2013.01); B32B 2457/00 (2013.01); B32B 2551/00 (2013.01)

(58) Field of Classification Search
USPC ................. 428/35.5, 34.9; 525/240; 29/428
See application file for complete search history.

(56) References Cited

U.S. PATENT DOCUMENTS 4,866,252 A * 9/1989 Van Loo ............. B29C 61/0625
219/535
5,470,622 A * 11/1995 Rinde ................. B29C 61/0616
156/84
(Continued)

FOREIGN PATENT DOCUMENTS

EP    2549314 A1    1/2013
EP    2549315 A2    1/2013
(Continued)

OTHER PUBLICATIONS

International Search Report, International Application No. PCT/US2015/041693, International Filing date Jul. 23, 2015.

Primary Examiner — Lynda Salvatore

(57) ABSTRACT

A tube assembly includes glass fiber, a heat-recovered heat recoverable tube surrounding at least a portion of the glass fiber, an adhesive having an adhesive composition comprising a reactive polyethylene and a reactive propylene copolymer. The adhesive adhesively couples the heat-recovered heat recoverable tube to the glass fiber. The adhesive composition includes a reactive polyethylene, such as, a maleic anhydride modified linear low density polyethylene resin, and a reactive propylene copolymer, such as, a maleic anhydride grafted polypropylene copolymer. The adhesive composition is capable of adhering to glass fiber with an axial load of 5 N at 70° C. for a period of at least 60 seconds.

20 Claims, 1 Drawing Sheet

(51) Int. Cl.
  *B32B 17/06* (2006.01)
  *B32B 27/08* (2006.01)
  *B32B 27/12* (2006.01)
  *C09J 123/06* (2006.01)
  *C09J 123/12* (2006.01)
  *C09J 151/06* (2006.01)
  *G02B 6/38* (2006.01)

(56) References Cited

U.S. PATENT DOCUMENTS 6,306,954 B1 10/2001 Nishikawa et al.
2003/0198763 A1 10/2003 Bicakci-Jenkins et al.

FOREIGN PATENT DOCUMENTS

JP 5247426 A 9/1993
WO WO 2013/117589 * 8/2013

* cited by examiner

HEAT RECOVERABLE TUBE ASSEMBLY AND ADHESIVE COMPOSITION FOR HEAT RECOVERABLE TUBE ASSEMBLY

FIELD

The present invention is directed to a method of attaching a portable connector device, tube assemblies, and adhesive and adhesive compositions within tube assemblies. More particularly, the present invention is directed to use of a heat recoverable tube assembly and the use of a reactive polyethylene and a reactive propylene copolymer in adhesive compositions for tube assemblies.

BACKGROUND OF THE INVENTION

It is desirable to provide a method that can attach a connector to an optical fiber in the field without the use of a ferrule. The use of a ferrule to align fibers is complex, expensive and difficult to install in the field. The present invention is directed to a method of using heat recoverable tubing and adhesive to attach an optical fiber to an optical fiber connector without the use of a ferrule. Tubing is widely used in optical and electrical systems in a variety of environments and applications. Adhesion to glass fibers or aluminum within such tubing can be important in some applications. Delamination or lacking adhesion can be detrimental to the operation of such systems, thereby causing operational interruptions for repair or replacement.

Known adhesives have not been able to meet the requirements of some environments. Current hot melt adhesives are usually polyethylene copolymers, such as ethylene-vinyl acetate and ethylene ethyl acrylate or polyamides. Such hot melts do not provide adequate adhesion to glass fiber at 70° C., thereby limiting use in certain applications. Polyamide hot melts are not able to be used in extrusion of microtubing or coextrusion with polyethylene because they create clogs, thereby preventing them from being used to produce single layer or dual-layer microtubing. Thermosetting adhesives are chemically reactive when heated at extrusion with polyethylene, thereby preventing them from being used to produce dual-layer microtubing.

A method for attaching a portable connector device, an adhesive, and a tube assembly that show improvements over the prior art would be desirable in the art.

BRIEF DESCRIPTION OF THE INVENTION

In an embodiment, a tube assembly includes glass fiber, a heat-recovered heat recoverable tube surrounding at least a portion of the glass fiber, an adhesive having an adhesive composition comprising a reactive polyethylene and a reactive propylene copolymer. The adhesive adhesively couples the heat-recovered heat recoverable tube to the glass fiber.

In another embodiment, an adhesive composition for a tube assembly includes a reactive polyethylene and a reactive propylene copolymer. The adhesive composition is capable of adhering to glass fiber with an axial load of 5 N at 70° C. for a period of at least 60 seconds.

In another embodiment, an adhesive composition for a tube assembly includes a maleic anhydride modified linear low density polyethylene resin and a maleic anhydride grafted polypropylene copolymer.

In another embodiment, an heat recoverable tube for a tube assembly wherein the heat recoverable tube is formed by coextruding a heat recoverable tube and the adhesive or formed by extruding a single layer heat recoverable tube and a single layer adhesive tube.

In another embodiment, a recoverable tube for a tube assembly wherein the heat recoverable tube includes polyethylene.

Other features and advantages of the present invention will be apparent from the following more detailed description, taken in conjunction with the accompanying drawings which illustrate, by way of example, the principles of the invention.

BRIEF DESCRIPTION OF THE DRAWINGS

Wherever possible, the same reference numbers will be used throughout the drawings to represent the same parts.

DETAILED DESCRIPTION OF THE INVENTION

Provided is a method of attaching portable connector device and a tube assembly. Embodiments of the present disclosure, in comparison to similar concepts failing to include one or more of the features disclosed herein, are capable of being used in a wider variety of environments and applications, adhere to glass fibers or aluminum, resist or eliminate delamination, extend operation of systems including such tube assemblies, are capable of being used in coextrusion with polyethylene without forming clogs, are capable of being used to produce dual-layer microtubing, are capable of being used to produce single layer microtubing, do not chemically react when used at extrusion with polyethylene, or exhibit a combination of such properties and/or advantages.

Figure 1:
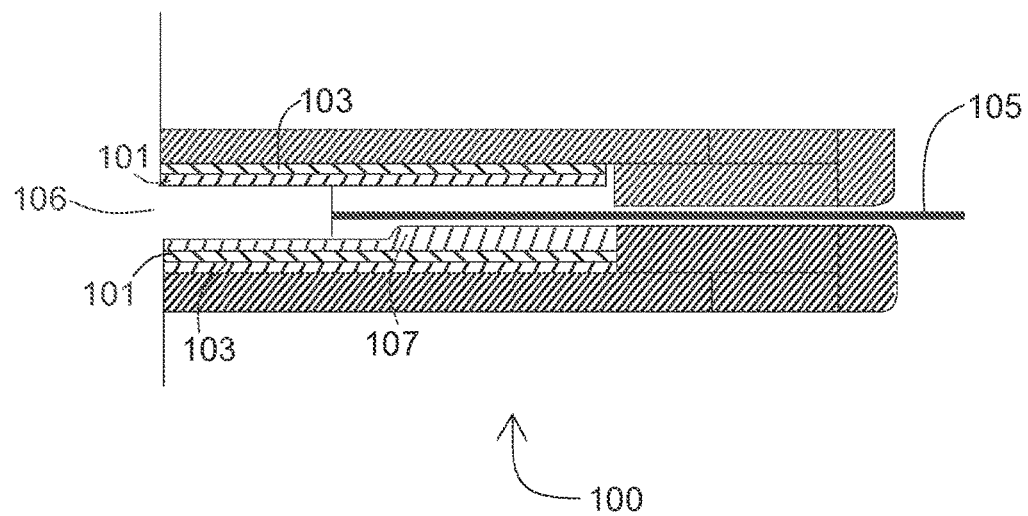
FIG. 1 is a schematic sectional view of a tube assembly having a heat recoverable tube, according to an embodiment of the disclosure.
Figure 2:
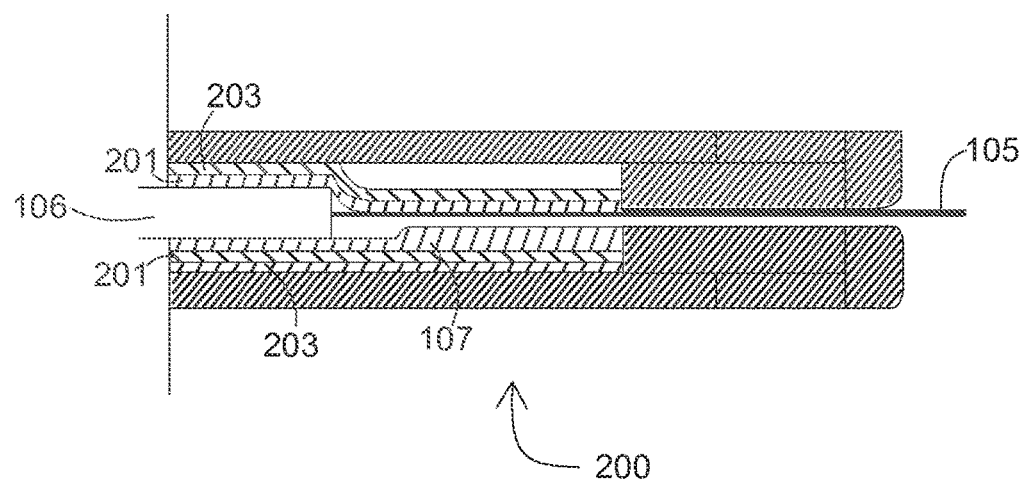
FIG. 2 is a schematic sectional view of a tube assembly having a heat-recovered heat recoverable tube corresponding to the heat recoverable tube of FIG. 1, according to an embodiment of the disclosure.

Referring to FIG. 1, a tube assembly 100 includes a heat recoverable tube 103, an adhesive 101 and a core material 105 surrounded by the heat recoverable tube 103 and adhesive 101. As shown in FIG. 2, a heat-recovered heat recoverable tube assembly 200 formed from the heat recoverable tube assembly 100 includes a heat-recovered heat recoverable tube 203, a heat melted adhesive 201 and the core material 105 surrounded by the heat-recovered heat recoverable tube 203 and heat melted adhesive 201. The core material 105 is any suitable material capable of being surrounded by the heat recoverable tube 103 and/or the heat-recovered heat recoverable tube 203 by the adhesive 101 and/or the adhesive 201. In one embodiment, the core material 105 is or includes glass fiber, such as fiber optics. In another embodiment, the core material 105 is or includes a conductive material, such as aluminum.

Upon forming the heat recoverable tube assembly 100, in one embodiment, the heat recoverable tube assembly 100 is heated to form the heat-recovered heat recoverable tube assembly 200. For example, the heat recoverable tube assembly 100 is heat recovered in a forced air oven at a temperature (for example, 150° C. for uniform shrinkage or between 120° C. and 180° C.) for a duration (for example, 3 minutes to 5 minutes, up to 15 minutes, or longer) to heat above the melting temperature of the extrudable blend in the heat recoverable tubing and the adhesive. In a further embodiment, the heat recoverable tube assembly 100 and/or the heat-recovered heat recoverable tube assembly 200 have one or more properties, such as, not failing under heat shock conditions of 225° C. for 4 hours, not failing under heat aging conditions of 175° C. for 168 hours, and not failing under low temperature flex testing at −40° C.

In one embodiment, the heat recoverable tube assembly 100 and/or the heat-recovered heat recoverable tube assembly 200 are a portion of a system, such as any suitable optical system and/or electrical systems. Suitable optical systems include, but are not limited to, optical connectors, optical fiber splices, optical fiber terminations or a combination thereof. Suitable electrical systems include, but are not limited to, electrical connectors, electrical wire splices, electrical wire terminations, or a combination thereof.

An extrudable blend used to form the heat recoverable tube assembly 100 or the heat-recovered heat recoverable tube assembly 200 is or includes any heat recoverable materials capable of heat recovery. In one embodiment, the extrudable blend used to form the heat recoverable tubing includes high density polyethylene (HDPE) and/or low density polyethylene (LDPE). In another embodiment, the extrudable blend used to form the adhesive includes a reactive polyethylene and a reactive propylene copolymer. For example, in one embodiment, the extrudable blend includes the reactive polyethylene at a concentration, by weight, of between 30% and 50%, between 30% and 40%, between 40% and 50%, or any suitable combination, sub-combination, range, or sub-range therein (with incidental impurities) and the reactive propylene copolymer at a concentration, by weight, of between 50% and 70%, between 50% and 60%, between 60% and 70%, or any suitable combination, sub-combination, range, or sub-range therein (with incidental impurities).

In one embodiment, the extrudable blend used to form the heat recoverable tubing 103 includes a radiation promoter or crosslinker, such as triallyl cyanurate, triallyl isocyanurate, multifunctional acrylates or methacrylates at any suitable concentration and exposed to ionizing radiation. Suitable concentrations of the radiation promotors for the heat recoverable tubing include, but not limited to, the radiation promotor being at a concentration from 0.5% to 5%, by weight, of between 1% and 2%, and between 2% and 3%. In one embodiment, the extrudable blend used to form the adhesive 101 includes an anti-radiation additive, such as a hindered thiophenol. Suitable concentrations of the anti-radiation promoters for the adhesive include, but are not limited to, the anti-radiation additive being at a concentration from 0.5% to 5%, by weight, of between 1% and 5%, between 2% and 4%, or any suitable combination, sub-combination, range, or sub-range therein. In addition, in one embodiment, other additives, such as stabilizers, antioxidants, colorants, lubricants, fillers or other additives, are in the extrudable blend.

In one embodiment, the suitability of the composition of the extrudable blend is, at least in part, based upon permitting the heat recoverable tube assembly 100 or the heat-recovered heat recoverable tube assembly 200 to have a tensile strength between 4500 psi and 5500 psi (for example, 5174 psi), a volume resistivity of between 1.00 E+14 ohm-cm and 2.00 E+16 ohm-cm (for example, 1.49 E+16 ohm-cm), an ultimate elongation of between 700% and 800% (for example, 750%), a dielectric strength of between 2400 v/mil and 2500 v/mil (for example, 2471 v/mil), a water absorption of less than 0.1 wt. %, or a combination thereof.

The heat recoverable tube 103 or the heat-recovered heat recoverable tube assembly 200 has any suitable diameter. In one embodiment, the expanded diameter is at least 0.05 inches, at least 0.07 inches, at least 0.1 inches, at least 0.5 inch, between 0.05 inches and 0.1 inches, between 0.1 inches and 1 inches, between 1 inch and 2 inches, between 0.5 inches and 3 inches, between 0.05 inches and 0.1 inches, between 0.075 inches and 0.085 inches, between 0.080 inches and 0.085 inches, or any suitable combination, sub-combination, range, or sub-range therein.

The heat recoverable tube 103 and/or the heat-recovered heat recoverable tube 203 adhere to the core material 105 with an adhesive 101 and/or adhesive 201. The adhesive 101 and/or adhesive 201 has an adhesive composition including a reactive polyethylene (for example, a maleic anhydride modified linear low density polyethylene resin) and a reactive propylene copolymer (for example, a maleic anhydride grafted polypropylene copolymer) at any suitable concentration. Suitable concentrations of the reactive polyethylene are, by weight, at least 5%, at least 40%, between 30% and 60%, between 40% and 60%, between 30% and 50%, or any suitable combination, sub-combination, range, or sub-range therein. Suitable concentrations of the reactive propylene copolymer are, by weight, at least 5%, at least 50%, at least 60%, between 30% and 70%, between 40% and 60%, between 50% and 70%, or any suitable combination, sub-combination, range, or sub-range therein.

In embodiments with the core material 105 being the glass fiber, the adhesive 101 and/or adhesive 201 has the property of adhering to the glass fiber with an axial load of at least 5 N at 70° C. for a period of at least 60 seconds, of at least 10 N at 70° C. for a period of at least 80 seconds, of at least 12 N at 70° C. for a period of at least 80 seconds, of 12.4 N at 70° C. for a period of 87 seconds, or any suitable combination, sub-combination, range, or sub-range therein. The core material 105 of glass fiber has a diameter of 125 microns. In embodiments with the core material 105 being the aluminum, the adhesive 101 and/or adhesive 201 has the property of adhering to aluminum with an axial load of at least 5 N at 70° C., at least 10 N at 70° C., at least 15 N at 70° C., at 15.4 N at 70° C., or any suitable combination, sub-combination, range, or sub-range therein. The core material 105 of aluminum has a diameter of 0.018 inch.

The adhesive 101 is treated or prepared in any suitable manner. In one embodiment, the adhesive 101 is coextruded with the heat recoverable tube 103. In one embodiment, the adhesive 101 is irradiated with the heat recoverable tube 103 to a modulus at 30% elongation, for example, at between 50 psi and 300 psi, at between 60 psi and 150 psi, at between 85 psi and 105 psi, or any suitable combination, sub-combination, range, or sub-range therein, and at a temperature between 130° C. and 170° C. (for example, 150° C.).

Examples

In a first example, according to an embodiment of the disclosure, an adhesive composition with the reactive polyethylene being a maleic anhydride modified linear low density polyethylene resin (for example, Orevac OE825, available from Arkema Group, King of Prussia, Pa.) at a concentration, by weight, of 40%, and the reactive propylene copolymer being a maleic anhydride grafted polypropylene copolymer (for example, Orevac 18732, available from Arkema Group, King of Prussia, Pa.) at a concentration, by weight, of 60%, is used to produce an adhesive. The adhesive is coextruded with an extrudable blend of HDPE and LDPE to form a heat recoverable tube that is positioned to surround glass fiber, such as fiberoptics. The heat recoverable tube is irradiated to a modulus at 30% elongation at 150° C. of 85 to 105 psi and produces the heat-recovered heat recoverable tube surrounding the adhesive, which surrounds the glass fiber, all of which define a tube assembly. The adhesive adheres the glass fiber to the heat-recovered heat recoverable tube at a force of up to 12.4 N at 70° C. for a period of 87 seconds without delamination.

In a second example, a comparative example, an adhesive composition has a maleic anhydride modified linear low density polyethylene resin (for example, Orevac OE825, available from Arkema Group, King of Prussia, Pa.) at a concentration, by weight, of 100%, that is used to produce an adhesive. The adhesive is coextruded with an extrudable blend of HDPE and LDPE to form a heat recoverable tube that is positioned to surround glass fiber, such as fiberoptics. The heat recoverable tube is irradiated to a modulus at 30% elongation at 150° C. of 85 to 105 psi and produces a heat-recovered heat recoverable tube surrounding the adhesive, which surrounds the glass fiber, all of which define a comparative tube assembly. The adhesive fails to adhere the glass fiber to the heat-recovered heat recoverable tube at a force of 3.3 N at 70° C.

In a third example, a comparative example, an adhesive composition includes a random terpolymer of ethylene, butyl acrylate ester and maleic anhydride, polymerized by a high-pressure autoclave process (for example, Lotader 3210, available from Arkema Group, King of Prussia, Pa.) at a concentration, by weight, of 44%, an ethylene, butyl acrylate and acrylic acid copolymer (for example, Lucalen A2920, available from Lyondell Basell of Houston, Tex.) at a concentration, by weight, of 43%, a cycloaliphatic hydrocarbon resin (for example, Escorez 5340, available from ExxonMobil Chemical of Houston, Tex.) at a concentration, by weight, of 10%, and a hindered thiophenol antioxidant (for example, Lowinox TBM6, available from Addivant of Middlebury, Conn.) at a concentration, by weight, of 3%, that are used to produce an adhesive. The adhesive is coextruded with an extrudable blend of LDPE to form a heat recoverable tube that is positioned to surround glass fiber, such as fiberoptics. The heat recoverable tube is irradiated to a modulus at 30% elongation at 150° C. of 85 to 105 psi and produces the heat-recovered heat recoverable tube surrounding the adhesive, which surrounds the glass fiber, all of which define a comparative tube assembly. The adhesive fails to adhere the glass fiber to the heat-recovered heat recoverable tube at a force of 2.9 N at 70° C.

In a fourth example, a comparative example, an adhesive composition includes a random terpolymer of ethylene, butyl acrylate and maleic anhydride, polymerized by a high-pressure autoclave process (for example, Lotader 3210, available from Arkema Group, King of Prussia, Pa.) at a concentration, by weight, of 42%, an ethylene, butyl acrylate and acrylic acid copolymer (for example, Lucalen A2920, available from Lyondell Basell of Houston, Tex.) at a concentration, by weight, of 43%, a cycloaliphatic hydrocarbon resin (for example, Escorez 5340, available from ExxonMobil Chemical of Houston, Tex.) at a concentration, by weight, of 10%, a hindered thiophenol antioxidant (for example, Lowinox TBM6, available from Addivant of Middlebury, Conn.) at a concentration, by weight, of 3%, and a reaction product of vinylbenzyl chloride and ethylene diaminopropyltrimethoxysilane (for example, Dow Corning Z-6032, available from Dow Corning of Midland, Mich.) at a concentration, by weight, of 2%, that are used to produce an adhesive. The adhesive is coextruded with an extrudable blend of HDPE and LDPE to form a heat recoverable tube that is positioned to surround glass, such as fiberoptics. The heat recoverable tube is irradiated to a modulus at 30% elongation at 150° C. of 85 to 105 psi and produces the heat-recovered heat recoverable tube surrounding the adhesive, which surrounds the glass fiber, all of which define a comparative tube assembly. The adhesive fails to adhere the glass fiber to the heat-recovered heat recoverable tube at a force of 3.8 N at 70° C.

In a fifth example, a comparative example, an adhesive composition includes a random terpolymer of ethylene, butyl acrylate and maleic anhydride, polymerized by a high-pressure autoclave process (for example, Lotader 3210, available from Arkema Group, King of Prussia, Pa.) at a concentration, by weight, of 42%, an ethylene, butyl acrylate and acrylic acid copolymer (for example, Lucalen A2920, available from Lyondell Basell of Houston, Tex.) at a concentration, by weight, of 43%, a cycloaliphatic hydrocarbon resin (for example, Escorez 5340, available from ExxonMobil Chemical of Houston, Tex.) at a concentration, by weight, of 10%, a hindered thiophenol antioxidant (for example, Lowinox TBM6, available from Addivant of Middlebury, Conn.) at a concentration, by weight, of 3%, and a bifunctional silane containing a methacrylate reactive organic group and a trimethoxysilyl inorganic group (for example, Dow Corning Z-6040, available from Dow Corning of Midland, Mich.) at a concentration, by weight, of 2%, that are used to produce an adhesive. The adhesive is coextruded with an extrudable blend of LDPE to form a heat recoverable tube that is positioned to surround glass fiber, such as fiberoptics. The heat recoverable tube is irradiated to a modulus at 30% elongation at 150° C. of 85 to 105 psi and produces a heat-recovered heat recoverable tube surrounding the adhesive, which surrounds the glass fiber, all of which define a comparative tube assembly. The adhesive fails to adhere the glass fiber to the heat-recovered heat recoverable tube at a force of 4 N at 70° C.

In a sixth example, a comparative example, an adhesive composition includes a random terpolymer of ethylene, ethyl acrylate and maleic anhydride (for example, Lotader 8200, available from Arkema Group, King of Prussia, Pa.) at a concentration, by weight, of 80%, an ethylene-vinyl acetate/acid terpolymer resin (for example, Elvax 4310, available from DuPont, Wilmington, Del.) at a concentration, by weight, of 12%, a thermoplastic hydrocarbon resin formulated from a mixture of aromatic and aliphatic feedstocks (for example, Nevpene 9500, available from Neville Chemical, Pittsburgh, Pa.) at a concentration, by weight, of 5%, and a hindered thiophenol antioxidant (for example, Lowinox TBM6, available from Addivant of Middlebury, Conn.) at a concentration, by weight, of 3%, that are used to produce an adhesive. The adhesive is coextruded with an extrudable blend of LDPE to form a heat recoverable tube that is positioned to surround glass fiber, such as fiberoptics. The heat recoverable tube is irradiated to a modulus at 30% elongation at 150° C. of 85 to 105 psi and produces a heat-recovered heat recoverable tube surrounding the adhesive, which surrounds the glass fiber, all of which define a comparative tube assembly. The adhesive fails to adhere the glass fiber to the heat-recovered heat recoverable tube at a force of 1.6 N at 70° C.

In a seventh example, a comparative example, an adhesive composition includes an ethylene, butyl acrylate and acrylic acid copolymer (for example, Lucalen A2920, available from Lyondell Basell of Houston, Tex.) at a concentration, by weight, of 97%, and a hindered thiophenol antioxidant (for example, Lowinox TBM6, available from Addivant of Middlebury, Conn.) at a concentration, by weight, of 3%, that are used to produce an adhesive. The adhesive is coextruded with an extrudable blend of LDPE to form a heat recoverable tube that is positioned to surround glass fiber, such as fiberoptics. The heat recoverable tube is irradiated to a modulus at 30% elongation at 150° C. of 85 to 105 psi and produces a heat-recovered heat recoverable tube surrounding the adhesive, which surrounds the glass fiber, all of which define a comparative tube assembly. The adhesive fails to adhere the glass fiber to the heat-recovered heat recoverable tube at a force of 2.8 N at 70° C.

In an eighth example, a comparative example, an adhesive composition includes an ethylene-vinyl acetate/acid terpolymer resin (for example, Elvax 4310, available from DuPont, Wilmington, Del.) at a concentration, by weight, of 92%, a thermoplastic hydrocarbon resin formulated from a mixture of aromatic and aliphatic feedstocks (for example, Nevpene 9500, available from Neville Chemical, Pittsburgh, Pa.) at a concentration, by weight, of 5%, and a hindered thiophenol antioxidant (for example, Lowinox TBM6, available from Addivant of Middlebury, Conn.) at a concentration, by weight, of 3%, that are used to produce an adhesive. The adhesive is coextruded with an extrudable blend of LDPE to form a heat recoverable tube that is positioned to surround glass fiber, such as fiberoptics. The heat recoverable tube is irradiated to a modulus at 30% elongation at 150° C. of 85 to 105 psi and produces a heat-recovered heat recoverable tube surrounding the adhesive, which surrounds the glass fiber, all of which define a comparative tube assembly. The adhesive fails to adhere the glass fiber to the heat-recovered heat recoverable tube at a force of 1.6 N at 70° C.

In a ninth example, a comparative example, an adhesive composition includes a polyamide hot melt adhesive (for example, Macromelt 6238, available from Henkel, Rocky Hill, Conn.) at a concentration, by weight, of 100%, that is used to produce an adhesive. The adhesive is coextruded with an extrudable blend of HDPE and LDPE to form a heat recoverable tube that is positioned to surround glass fiber, such as fiberoptics. The heat recoverable tube is irradiated to a modulus at 30% elongation at 150° C. of 85 to 105 psi and produces a heat-recovered heat recoverable tube surrounding the adhesive, which surrounds the glass fiber, all of which define a comparative tube assembly. The adhesive fails to adhere the glass fiber to the heat-recovered heat recoverable tube at a force of 4 N at 70° C.

While the invention has been described with reference to one or more embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims. In addition, all numerical values identified in the detailed description shall be interpreted as though the precise and approximate values are both expressly identified.

What is claimed is:

1. A tube assembly, comprising:
   a heat-recovered heat recoverable tube;
   a core material consisting of a single glass fiber, the core material extending into the heat-recovered heat recoverable tube at a first end of the heat-recovered heat recoverable tube; and
   an adhesive in the heat-recovered heat recoverable tube, the adhesive having an adhesive composition comprising a reactive polyethylene and a reactive propylene copolymer, the adhesive adhering to the single glass fiber and adhering the core material to the heat-recovered heat recoverable tube.

2. The tube assembly of claim 1, wherein the adhesive composition includes the reactive polyethylene being at a concentration, by weight, of at least 5%.

3. The tube assembly of claim 1, wherein the adhesive composition includes the reactive polyethylene being at a concentration, by weight, of at least 40%.

4. The tube assembly of claim 1, wherein the adhesive composition includes the reactive propylene copolymer being at a concentration, by weight, of at least 5%.

5. The tube assembly of claim 1, wherein the adhesive composition includes the reactive propylene copolymer being at a concentration, by weight, of at least 60%.

6. The tube assembly of claim 1, wherein the heat-recovered heat recoverable tube is formed by coextruding a heat recoverable tube and the adhesive.

7. The tube assembly of claim 1, wherein the adhesive and heat recoverable tube are irradiated.

8. The tube assembly of claim 1, wherein the adhesive and heat recoverable tube are irradiated to a modulus at 30% elongation at 150° C. of 85 to 105 psi.

9. The tube assembly of claim 1, wherein the heat-recovered heat recoverable tube is formed from a heat recoverable tube comprising high density polyethylene.

10. The tube assembly of claim 1, wherein the heat-recovered heat recoverable tube is formed from a heat recoverable tube comprising low density polyethylene.

11. The tube assembly of claim 1, wherein the adhesive has a property of adhering to the single glass fiber with an axial load of 5 N at 70° C. for a period of at least 60 seconds.

12. The tube assembly of claim 1, wherein the adhesive has a property of adhering to the single glass fiber with an axial load of 10 N at 70° C. for a period of at least 80 seconds.

13. The tube assembly of claim 1, wherein the adhesive has a property of being capable of adhering to aluminum with an axial load of 15 N at 70° C.

14. The tube assembly of claim 1, wherein the reactive polyethylene is a maleic anhydride modified linear low density polyethylene resin or a maleic anhydride grafted polypropylene copolymer.

15. The tube assembly of claim 1, wherein the tube assembly is positioned in an optical system or an electrical system.

16. The tube assembly of claim 1, wherein the heat-recovered heat recoverable tube is formed by extruding a single layer of heat recoverable tube, extruding a single layer of adhesive, and placing the adhesive layer inside the heat recoverable tube.

17. The tube assembly of claim 1, wherein the adhesive and heat recoverable tube are irradiated to a modulus at 30% elongation at 150° C. of 50 to 300 psi.

18. The tube assembly of claim 1, wherein the single glass fiber is an optical fiber.

19. The tube assembly of claim 1, wherein the core material has a diameter of 125 micrometers.

20. The tube assembly of claim 1, wherein the reactive polyethylene is a maleic anhydride modified linear low density polyethylene resin and the reactive propylene copolymer is a maleic anhydride grafted polypropylene copolymer.

* * * * *